United States Patent
Oh et al.

(10) Patent No.: US 12,223,942 B2
(45) Date of Patent: Feb. 11, 2025

(54) METHOD OF VIRTUALIZING CHARACTERISTICS OF INTERNAL COMBUSTION ENGINE VEHICLE IN ELECTRIC VEHICLE

(71) Applicants: HYUNDAI MOTOR COMPANY, Seoul (KR); KIA CORPORATION, Seoul (KR)

(72) Inventors: Ji Won Oh, Hwaseong-si (KR); Jeong Soo Eo, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 313 days.

(21) Appl. No.: 18/074,105

(22) Filed: Dec. 2, 2022

(65) Prior Publication Data
US 2023/0395059 A1     Dec. 7, 2023

(30) Foreign Application Priority Data
Jun. 2, 2022    (KR) .................. 10-2022-0067308

(51) Int. Cl.
    *G10K 15/02*     (2006.01)
    *B60L 15/20*     (2006.01)

(52) U.S. Cl.
CPC ............. *G10K 15/02* (2013.01); *B60L 15/20* (2013.01); *B60L 2240/423* (2013.01); *B60L 2240/44* (2013.01); *B60L 2240/486* (2013.01)

(58) Field of Classification Search
CPC ... G10K 15/02; B60L 15/20; B60L 2240/423; B60L 2240/44; B60L 2240/486

(Continued)

(56) References Cited

U.S. PATENT DOCUMENTS 6,378,636 B1 * 4/2002 Worrel .................. B60T 17/221
    180/65.25
7,285,869 B2 * 10/2007 Syed ...................... B60W 20/11
    322/29

(Continued)

FOREIGN PATENT DOCUMENTS

KR    10-2014-0014717 A    2/2014
KR       10-1427625 B1    8/2014

(Continued)

*Primary Examiner* — Luis A Martinez Borrero
(74) *Attorney, Agent, or Firm* — MORGAN, LEWIS & BOCKIUS LLP

(57) ABSTRACT

Proposed is a method of virtualizing characteristics of an internal combustion engine vehicle in an electric vehicle, the method including obtaining, by a controller, powertrain state information for a vehicle powertrain including a motor that makes a vehicle move and a power transmission device between the motor and driving wheels, determining, by the controller, tooth surface pressures of gears in the powertrain between the motor and the driving wheels based on the obtained powertrain state information, generating, by the controller, a virtual effect signal for generating a virtual effect that simulates powertrain characteristics of the internal combustion engine vehicle based on the determined tooth surface pressures of the gears in the powertrain, and generating, by the controller, the virtual effect that simulates the powertrain characteristics of the internal combustion engine vehicle.

20 Claims, 9 Drawing Sheets

(58) Field of Classification Search
USPC .......................................................... 701/22
See application file for complete search history.

(56) References Cited

U.S. PATENT DOCUMENTS

| | | | |
|---|---|---|---|
| 7,398,147 B2* | 7/2008 | Kozarekar | B60W 20/15 |
| | | | 903/905 |
| 8,417,431 B2* | 4/2013 | Okubo | G16Z 99/00 |
| | | | 701/99 |
| 9,147,296 B2* | 9/2015 | Ricci | G06F 3/04886 |
| 9,227,525 B2* | 1/2016 | Fleege | H02P 29/032 |
| 9,401,056 B2* | 7/2016 | Lee | G01M 17/007 |
| 9,533,561 B2 | 1/2017 | Murata | |
| 9,550,488 B1* | 1/2017 | Johri | B60K 6/48 |
| 10,059,260 B2* | 8/2018 | Kim | G10K 15/02 |
| 10,766,479 B2* | 9/2020 | Galang | B60W 10/06 |
| 10,807,600 B2* | 10/2020 | Jordan, III | B60K 35/00 |
| 11,420,615 B2* | 8/2022 | Kanno | B60W 20/19 |
| 11,813,981 B2* | 11/2023 | Vangelov | B60W 10/101 |
| 12,134,321 B2* | 11/2024 | Oh | B60L 15/20 |
| 2010/0134058 A1* | 6/2010 | Nagashima | H02P 21/06 |
| | | | 180/65.285 |
| 2014/0343770 A1* | 11/2014 | Sponheimer | B60L 15/2036 |
| | | | 701/22 |
| 2015/0291175 A1 | 10/2015 | Harada et al. | |
| 2017/0103147 A1* | 4/2017 | Khanna | G06N 20/00 |
| 2020/0070809 A1* | 3/2020 | Alcantar | B60K 28/16 |
| 2020/0184946 A1* | 6/2020 | Jung | B60Q 5/008 |
| 2021/0049843 A1 | 2/2021 | Oh et al. | |
| 2021/0053487 A1* | 2/2021 | Vangelov | B60K 35/10 |
| 2021/0309113 A1* | 10/2021 | Mazzini | B60L 7/14 |
| 2022/0089035 A1* | 3/2022 | Oh | B60L 50/60 |
| 2023/0016272 A1* | 1/2023 | Kim | B60W 50/14 |
| 2023/0322094 A1* | 10/2023 | van Nus | B60L 15/20 |
| | | | 701/22 |
| 2023/0391205 A1* | 12/2023 | Oh | B60L 15/20 |
| 2023/0391339 A1* | 12/2023 | Oh | B60Q 9/00 |
| 2023/0395059 A1* | 12/2023 | Oh | B60L 15/20 |
| 2024/0181893 A1* | 6/2024 | Oh | B60Q 5/008 |

FOREIGN PATENT DOCUMENTS

| | | |
|---|---|---|
| KR | 10-1689236 B1 | 12/2016 |
| KR | 10-1798051 B1 | 11/2017 |
| KR | 10-2020-0094507 A | 8/2020 |
| KR | 10-2021-0020189 A | 2/2021 |

* cited by examiner

|  | TORQUE | TOOTH SURFACE PRESSURE |
|---|---|---|
| A DIRECTION | FORWARD TORQUE | FORWARD PRESSURE, POSITIVE PRESSURE |
| B DIRECTION | REVERSE TORQUE | REVERSE PRESSURE, NEGATIVE PRESSURE |

METHOD OF VIRTUALIZING CHARACTERISTICS OF INTERNAL COMBUSTION ENGINE VEHICLE IN ELECTRIC VEHICLE

CROSS REFERENCE TO RELATED APPLICATION

The present application claims priority to Korean Patent Application No. 10-2022-0067308, filed Jun. 2, 2022 in the Korean Intellectual Property Office, the entire contents of which is incorporated herein for all purposes by this reference.

TECHNICAL FIELD

The present disclosure relates to a method of virtualizing characteristics of an internal combustion engine (ICE) vehicle in an electric vehicle (EV) and, more particularly, to a method of virtualizing an operation feeling of a powertrain including an internal combustion engine, a transmission, and a clutch, as well as driving feeling of an ICE vehicle, in an EV.

BACKGROUND

As is known, an electric vehicle (EV) is a vehicle that runs on a motor as a driving device. A battery electric vehicle (BEV) is a pure electric vehicle that runs using only a motor.

A powertrain of a battery electric vehicle includes a battery that supplies power to drive a motor, and an inverter connected to the battery, a motor that is a driving device for making a vehicle move and is connected the battery for charging and discharging via the inverter, and a reducer that reduces rotational force of the motor and transmits the rotational force to driving wheels.

Unlike a conventional internal combustion engine (ICE) vehicle, a typical electric vehicle does not have a multi-speed transmission, and instead a reducer with a fixed gear ratio is disposed between a motor and driving wheels.

This is because, unlike an internal combustion engine, which has a wide distribution range of energy efficiency according to the operating point and can provide high torque only in the high-speed region, in the case of a motor, the difference in efficiency according to the operating point is relatively small, and it is possible to realize low speed and high torque only with the characteristics of a single motor unit.

In addition, vehicles equipped with a conventional internal combustion engine powertrain require a starting mechanism such as a torque converter or clutch due to the characteristics of an internal combustion engine that low-speed operation is impossible, while in a powertrain of an electric vehicle, the starting mechanism may be removed as the motor has the characteristics of being easy to run at low speeds.

Furthermore, the powertrain of an electric vehicle generates power by running a motor with electric energy from a battery, rather than generating power by burning fuel as in a conventional internal combustion engine vehicle.

Accordingly, compared to the torque of an internal combustion engine generated by aerodynamic and thermodynamic reactions, the torque of an electric vehicle is generally characterized by being more sophisticated, smoother, and more responsive. Due to these mechanical differences, unlike internal combustion engine vehicles, electric vehicles may provide smooth operation without interruption of drivability due to shifting gears, etc.

Moreover, in automobiles equipped with conventional internal combustion engine powertrains, the main source of vibrations is the internal combustion engine (engine). The vibrations generated by the periodic explosive force of the internal combustion engine in the ignition-on state is transmitted to a vehicle body and passengers through the powertrain or mount.

These vibrations are often considered negative factors to be damped. In this aspect, since there is no vibration source in the electric vehicle in which the motor replaces the engine, it is advantageous compared to the internal combustion engine vehicle in terms of improving ride comfort.

However, for drivers looking for a fun driving experience, the absence of vibrations from the engine may make them feel bored. In particular, in electric vehicles, which aim for high performance, there are times when it is necessary to provide not only a smooth feeling but also a rough and trembling sensation.

Yet, electric vehicles have limitations in providing these emotional elements to the driver. Thus, there is a need for a method of creating virtual effects that simulate vibrations and sounds produced by the powertrain of an internal combustion engine vehicle in an electric vehicle.

In particular, it is necessary to provide a function for virtualizing the driving characteristics of an internal combustion engine vehicle, so that the driver may experience the desired sensation in his or her vehicle without having to switch to an internal combustion engine vehicle when the driver wants to feel the driving sensibility, fun, excitement, and direct shift feeling provided by the engine, transmission, clutch, etc.

SUMMARY

Accordingly, the present disclosure has been made keeping in mind the above problems occurring in the related art, and the present disclosure is intended to provide a method of virtualizing characteristics of a powertrain of an internal combustion engine vehicle in an electric vehicle, which enables a driver to experience the driving sensibility, fun, excitement, and direct shift feeling provided by an internal combustion engine (engine), transmission, clutch, etc.

Objectives of the present disclosure are not limited to the objective mentioned above, and other objectives not mentioned will be clearly understood by those skilled in the art to which the present disclosure pertains from the description below (hereinafter referred to as "person of ordinary skill").

In order to achieve the above objective, according to an embodiment of the present disclosure, there is provided a method of virtualizing characteristics of an internal combustion engine vehicle in an electric vehicle, the method including: obtaining, by a controller, powertrain state information for a vehicle powertrain including a motor that makes a vehicle move and a power transmission device between the motor and driving wheels; determining, by the controller, tooth surface pressures of gears in the powertrain between the motor and the driving wheels on the basis of the obtained powertrain state information; generating, by the controller, a virtual effect signal for generating a virtual effect that simulates powertrain characteristics of the internal combustion engine vehicle based on the determined tooth surface pressures of the gears in the powertrain; and generating, by the controller, the virtual effect that simulates the powertrain characteristics of the internal combustion engine vehicle by controlling operation of a virtual effect generation device that generates the virtual effect according to the generated virtual effect signal.

As described above, according to a method of virtualizing characteristics of an internal combustion engine vehicle in an electric vehicle, in an electric vehicle without an internal combustion engine (engine), transmission, clutch, etc., it is possible to virtualize and provide powertrain characteristics of an internal combustion engine vehicle through vibrations and sounds, and to provide a driver with feelings of operation and driving as if the actual internal combustion engine, transmission, and clutch were operating.

In addition, the driver can experience the driving sensibility, fun, excitement, and direct shift feeling provided by the powertrain of an internal combustion engine vehicle in his or her vehicle without having to switch to an internal combustion engine vehicle.

In particular, by generating virtual vibrations and virtual sounds that are linked to tooth surface pressure of a powertrain gear, the realism of the virtual effects can be maximized, and the highly realistic virtual effects can, in turn, greatly improve the vehicle's marketability.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION

Figure 1:
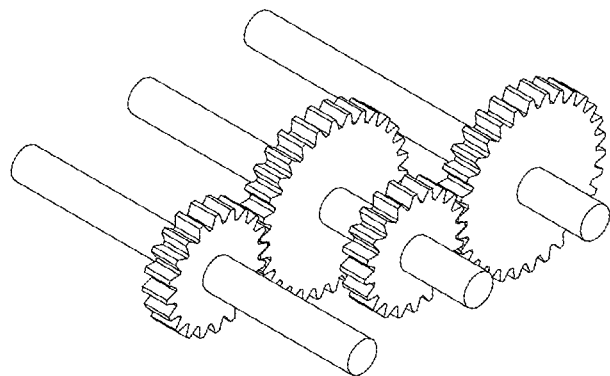
FIGS. 1 and 2 are views schematically showing a gear element of a powertrain in a vehicle.

Hereinafter, embodiments of the present disclosure will be described in detail with reference to the accompanying drawings. The specific structural or functional descriptions presented in the embodiments of the present disclosure are only exemplified for the purpose of describing the embodiments according to the concept of the present disclosure, and the embodiments according to the concept of the present disclosure may be implemented in various forms. In addition, it should not be construed that the disclosure is limited by the embodiments described herein, but should be understood to include all modifications, equivalents and substitutes included in the spirit and scope of the present disclosure.

Meanwhile, in the present disclosure, terms such as first and/or second may be used to describe various components, but the components are not limited by the terms. The terms are used only for the purpose of distinguishing one component from other components, for example, within the scope not departing from the scope of rights according to the concept of the present disclosure, the first component may be referred to as the second component, and similarly, the second component may also be referred to as the first component.

When a component is referred to as being "connected" to another component, it should be understood that the component may be directly connected to the other component, but other components may exist in between. On the other hand, when it is said that a component is "directly connected" to another component, it should be understood that no other component is present in the middle. Other expressions for describing the relationship between components, that is, expressions such as "between" and "immediately between" or "adjacent to" and "directly adjacent to" should be interpreted similarly.

Like reference numerals refer to like components throughout. The terminology used herein is for the purpose of describing the embodiments, and is not intended to limit the present disclosure. In this specification, the singular also includes the plural unless specifically stated in the phrase. As used herein, "comprises" and/or "comprising" do not exclude the presence or addition of one or more other components, steps, acts and/or elements by a recited component, step, operation and/or element.

The present disclosure seeks to provide a method of virtualizing characteristics of a powertrain of an internal combustion engine vehicle in an electric vehicle, which enables a driver to experience the driving sensibility, fun, excitement, and direct shift feeling provided by an internal combustion engine, transmission, clutch, etc.

In addition, the present disclosure seeks to provide a method of realizing virtual drivability so that a driver may experience the desired driving feel and sensation of an internal combustion engine vehicle in his or her vehicle without having to switch to an internal combustion engine vehicle.

To this end, it is necessary to create virtual effects that are linked to the powertrain characteristics of an internal combustion engine vehicle in an electric vehicle, which is the vehicle to be applied, to provide a more realistic driving feel and sensation to the driver. However, conventionally, there is a limitation in implementing virtual effects close to the powertrain characteristics of an actual internal combustion engine vehicle, only creating virtual effects that are linked only to an accelerator pedal input value (APS value), which is the driver's driving input information, or the powertrain speed or vehicle speed.

Moreover, although it is known to generate and provide virtual sounds in an electric vehicle, there is a problem in that the virtual sounds are different from the sounds generated in the actual internal combustion engine (engine) vehicle, so that the driver may feel a sense of difference.

Accordingly, the present disclosure focuses on enabling the driver to feel more realistic sensation and driving feel of the internal combustion engine-based powertrain by generating virtual vibrations and sounds to virtualize and provide the powertrain characteristics that could be felt in an internal combustion engine vehicle in an electric vehicle, and by generating virtual vibrations and sounds that are linked to the vehicle's powertrain characteristics and actual driving situations.

In the present disclosure, the main technical feature is to create and provide virtual vibration and sound effects that are linked to tooth surface pressures of the powertrain gears so that the driver may experience dynamic sensation without any sense of difference compared to an actual internal combustion engine vehicle.

In the present disclosure, an electric vehicle is a vehicle powered by a motor as a driving device for moving the vehicle, and is an electric vehicle in a broad sense including, for example, a battery electric vehicle (BEV), a hybrid electric vehicle (HEV), and a fuel cell electric vehicle (FCEV), which are pure electric vehicles.

In the case of a hybrid vehicle, the virtual effect creation and implementation process according to the present disclosure may be performed in an EV mode driven only by a motor. As described above, the method of emulating characteristics of an internal combustion engine vehicle according to the present disclosure may be applied to an electric vehicle powered by a motor.

In the following description, the terms internal combustion engine and engine have the same meaning, and the motor means a driving motor for moving the vehicle.

Vibration and sound generated in a vehicle equipped with an existing internal combustion engine (engine) may be mainly classified as follows.
1. Fluid sound by engine intake
2. Radiated vibration and sound due to explosion stroke and pressure change in engine combustion chamber
3. Vibration transmitted from engine vibration to the vehicle body through the powertrain, and radiated sound
4. Vibration and flow resonance acoustics by the engine exhaust system Among them, the most important for the driver or passengers in the vehicle is the number 3, vibration transmitted from engine vibration to the vehicle body through the powertrain, and radiated sound.

Therefore, the main purpose of creating virtual effects in electric vehicles, that is, creating virtual vibrations and sounds that mimic the vibrations and sounds generated by the powertrain in an internal combustion engine vehicle, is to provide the driver of an electric vehicle with the same sensation as in an internal combustion engine vehicle. Thus, regarding virtual vibration and sound creation in an electric vehicle, the vibration and sound effects corresponding to the number 3 above should be considered most importantly among the vibrations and sounds of an internal combustion engine vehicle.

Additionally, in an electric vehicle, the degree to which vibration is radiated to the vehicle body and cabin through the powertrain is proportional to the tooth surface pressure of the powertrain gear. At this time, powertrain gears refer to gears in which torque is transmitted between the motor and the driving wheels, and this may mean gears in a known powertrain in which rotational force is transmitted between the motor and the driving wheels in an electric vehicle. A typical powertrain gear in an electric vehicle is gears of a reducer.

According to the present disclosure, by generating virtual vibrations and virtual sounds that are linked to the tooth surface pressure of the powertrain gear as virtual effects simulating the powertrain characteristics of an internal combustion engine vehicle in an electric vehicle, the realism of the virtual effects may be maximized, and the highly realistic virtual effects may, in turn, greatly improve the vehicle's marketability.

Figure 2:
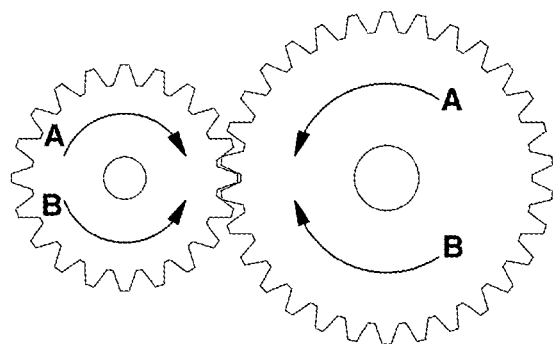

FIGS. 1 and 2 schematically show gears in a powertrain of a vehicle. In an electric vehicle, a powertrain includes a motor, which is a driving device for moving the vehicle, and a power transmission device such as a reducer including gears between the motor and driving wheels.

In addition, there are a plurality of gears that perform torque (and force) transmission through mutual meshing and simultaneous rotation in a powertrain between a motor, which is a driving device, and driving wheels connected to the motor for the purpose of power transmission.

In the powertrain of an internal combustion engine vehicle, as the gear tooth surface pressure increases, the vibration transmission characteristics between various moving parts of the powertrain become closer to a rigid body, and thus the transmission rate of vibration generated in the internal combustion engine increases.

On the contrary, the smaller the tooth surface pressure of the gear in the powertrain, the lower the stress between adjacent moving parts, making it difficult to transmit vibration, which leads to vibration energy attenuation by a surrounding lubrication part, thereby reducing the vibration transmission rate. That is, as the magnitude of the tooth surface pressure (absolute value of pressure) of the powertrain gear increases, the magnitude of the vibration increases and the magnitude of the vibration decreases as the magnitude of the tooth surface pressure of the powertrain gear decreases (refer to FIGS. 9 and 11 to be described later).

In consideration of this, in the present disclosure, as the size of the tooth surface pressure (absolute value of pressure) of the powertrain gear increases, the size of the virtual effect (the amplitude of vibration and the volume of the sound) becomes larger and the size of the virtual effect becomes smaller as the size of the tooth surface pressure of the powertrain gear decreases.

The main technical features of the present disclosure are, in order for the powertrain characteristics as described above to be expressed in an electric vehicle, virtual vibration and sound are set as described below as a virtual effect that simulates the characteristics of an internal combustion engine vehicle, and the vibrations and sounds reflecting the powertrain characteristics are generated and implemented to be provided to a driver.

For reference, in the present disclosure, the tooth surface pressure means the pressure applied by compression between the tooth surfaces of the gears engaged, and due to the characteristics of the gear, for each tooth, there are two surfaces (the surfaces of both sides of each tooth) on which the tooth pressure may act. According to the direction of the torque transmitted in the state in which the two gears are meshed, the pressure is applied to the selected one of the two surfaces of each tooth for each gear.

For example, when forward torque is transmitted through two gears, the tooth surface pressure (forward pressure) by compression acts on one of the two surfaces of each tooth for each gear, and conversely, when reverse torque is transmitted, the tooth surface pressure (reverse pressure) by compression acts on the other one of the two surfaces of each tooth for each gear.

Here, the forward torque applied from the motor, which is a driving device (reference numeral 41 in FIG. 3 to be described later), may be defined as a torque in the direction of accelerating a vehicle, while the reverse torque may be defined as a torque in the direction of decelerating the vehicle.

In addition, although pressure is a scalar value, not a vector value, so it has no directionality, in this specification, the tooth surface pressure acting by the application of the forward torque may be defined as the forward pressure, and the tooth surface pressure acting by the application of the reverse torque may be defined as the reverse pressure for convenience of explanation, and in this case, the pressure value may have directionality.

In the description of the present disclosure, a negative (−) pressure (see FIGS. 9 and 11) on the tooth surface means a reverse pressure, and a positive (+) pressure on the tooth surface means a forward pressure. Additionally, the forward pressure is the tooth pressure acting on one of the two surfaces of each tooth of the two gears, and the reverse pressure is the tooth pressure acting on the other of the two surfaces of each tooth of the two gears.

As such, in the tooth surface pressure acting on one tooth in each gear in the meshed state, the division of negative pressure and positive pressure, and the division of forward pressure and reverse pressure, depend on the direction of the torque (see FIG. 2).

Figure 3:
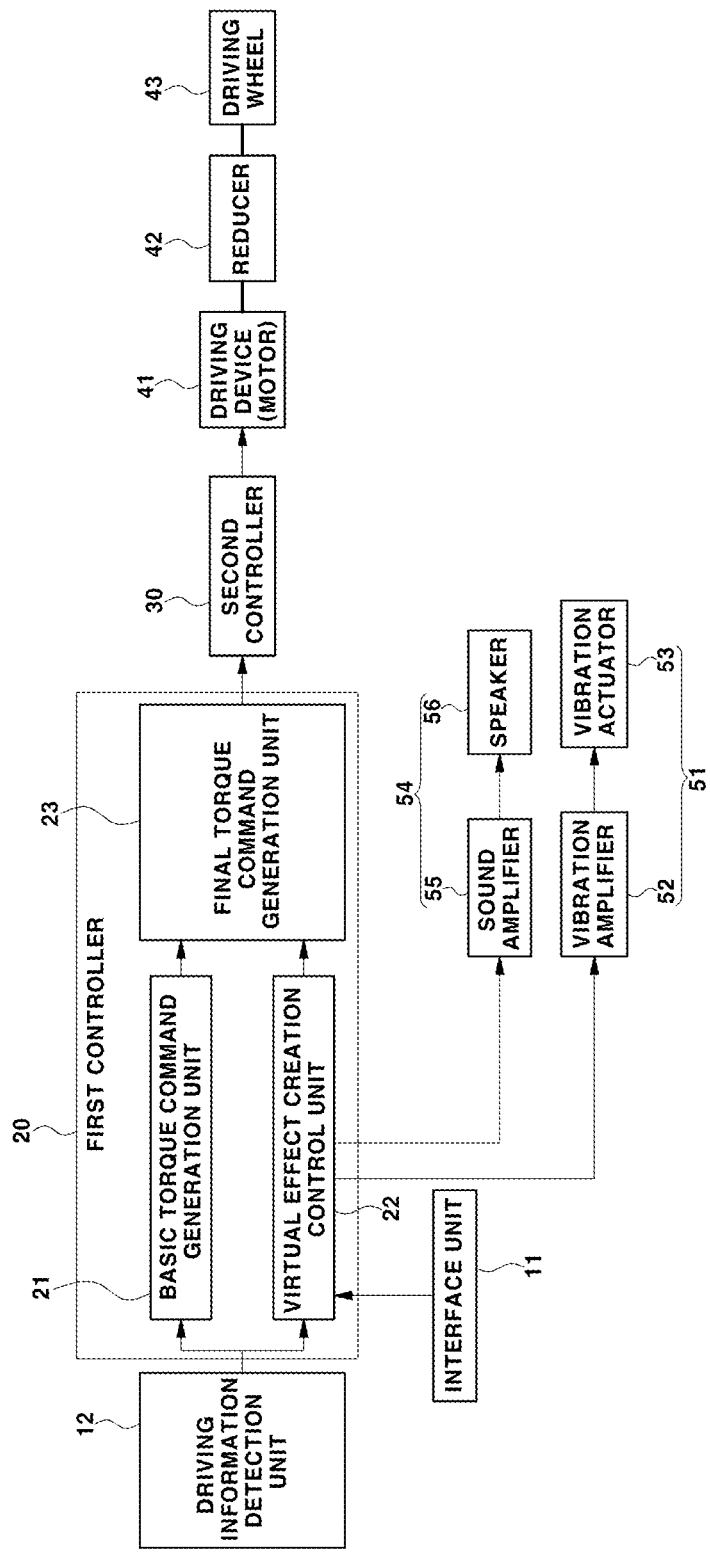
FIG. 3 is a block diagram showing the configuration of an apparatus for virtualizing characteristics of an internal combustion engine vehicle according to the present disclosure.
Figure 4:
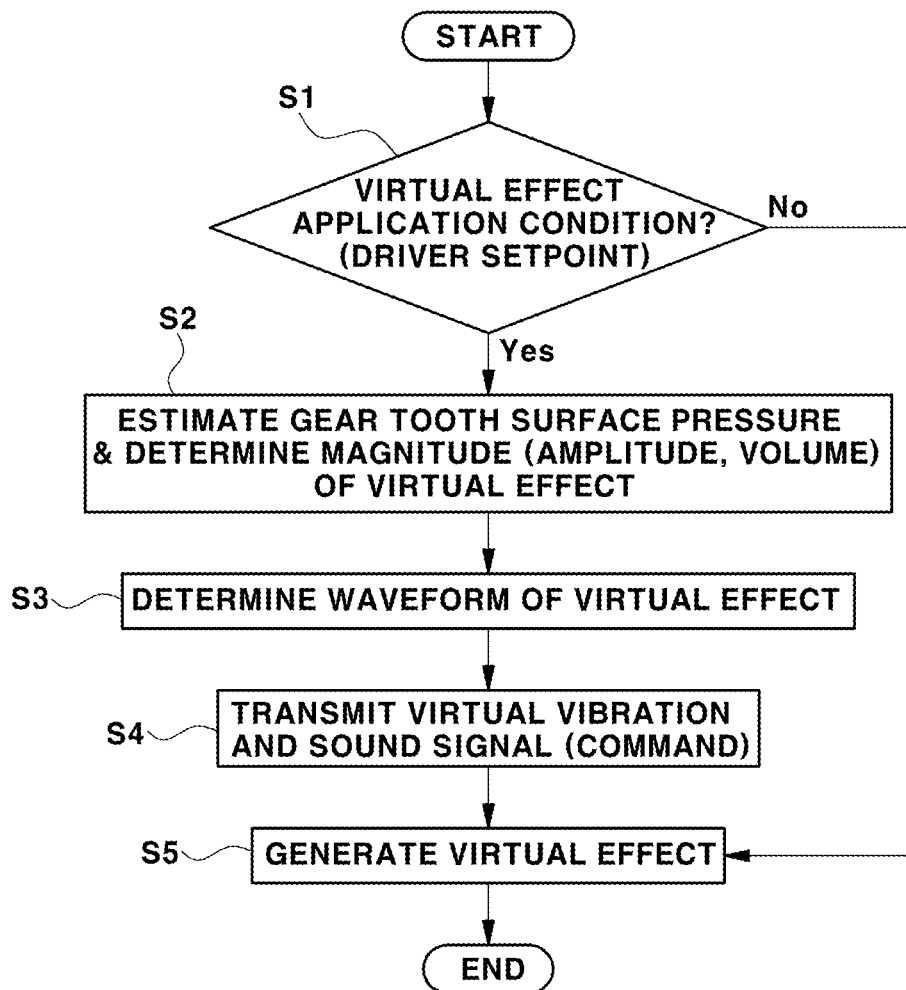
FIG. 4 is a flowchart showing the process for virtualizing characteristics of an internal combustion engine vehicle according to the present disclosure.

FIG. 3 is a block diagram showing the configuration of an apparatus for virtualizing characteristics of an internal combustion engine vehicle according to the present disclosure; and FIG. 4 is a flowchart showing the process for virtualizing characteristics of an internal combustion engine vehicle according to the present disclosure.

The method of virtualizing characteristics of an internal combustion engine vehicle in an electric vehicle according to the present disclosure is a method of virtualizing the operation feeling and driving feeling of a powertrain of an internal combustion engine vehicle in an electric vehicle.

In addition, in the present disclosure, virtualizing characteristics of an internal combustion engine vehicle means that, when the powertrain of the applicable vehicle that is an electric vehicle is operated, vibration and sound that are as similar as possible to those generated in the internal combustion engine vehicle are actually generated in the electric vehicle, although vibration and sound that do not occur in reality.

In particular, in the present disclosure, virtualizing the characteristics of the internal combustion engine vehicle means actually creating and providing vibration and sound in the electric vehicle, which simulate the actual vibration and sound generated by the powertrain in the internal combustion engine vehicle according to the powertrain characteristics, the operating condition of the powertrain, and the vehicle driving condition.

In the present disclosure, vibration and sound that simulate the actual vibration and sound are defined as a "virtual vibration" and a "virtual sound", and in the following description, a "virtual effect" includes one or both of the virtual vibration and the virtual sound.

As shown in FIG. 3, an apparatus for virtualizing the characteristics of an internal combustion engine vehicle according to the present disclosure includes: a driving information detection unit 12 that is installed in a vehicle and detects vehicle driving information; a first controller 20 that generates and outputs a torque command based on the vehicle driving information detected by the driving information detection unit 12; a second controller 30 that controls the operation of a driving device 41 according to the torque command output from the first controller 20.

In the following description, the control subject is divided into the first controller 20 and the second controller 30. However, the control process for virtualizing the characteristics of the internal combustion engine vehicle and realizing the virtual effect according to the present disclosure may be performed by one integrated control element instead of a plurality of controllers.

A plurality of controllers and one integrated control element may all be collectively referred to as a controller, and the control process of the present disclosure may be performed by the controller. In the following description, the term controller may refer to the first controller 20 and the second controller 30 collectively.

The driving information detection unit 12 is a component that determines a driver demand torque in the vehicle and detects vehicle driving information required to perform a virtual effect implementation function, and the vehicle driving information may include driver's driving input information and vehicle state information. In the following description, a "virtual effect implementation function" refers to a function for generating and implementing a virtual effect (virtual vibration and virtual sound simulating the vibration and sound of an internal combustion engine vehicle).

In an embodiment of the present disclosure, the driving information detection unit 12 includes: an accelerator pedal detection unit that detects accelerator pedal input information according to the driver's operation of the accelerator pedal; a brake pedal detection unit that detects brake pedal input information according to the driver's operation of the brake pedal; and a vehicle speed detection unit that detects vehicle speed.

Here, the accelerator pedal detection unit may be a conventional accelerator position sensor (APS) that is installed on the accelerator pedal and outputs an electrical signal according to the driver's operation state of the accelerator pedal. The brake pedal detection unit may be a conventional brake pedal sensor (BPS) that is installed on the brake pedal and outputs an electrical signal according to the driver's operation state of the brake pedal.

The vehicle speed detection unit may include a wheel speed sensor. Since obtaining vehicle speed information from the signal of the wheel speed sensor is a well-known technique in the art, so a detailed description thereof will be omitted.

The driver's driving input information among the vehicle driving information detected by the driving information detection unit 12 includes: an accelerator pedal input value (APS value) detected by the accelerator pedal detection unit as a driving input value according to the driver's operation of the accelerator pedal; and a brake pedal input value (BPS value) detected by the brake pedal detecting unit as a driving input value according to the driver's operation of the brake pedal. The vehicle speed detected by the vehicle speed detecting unit becomes vehicle state information among the vehicle driving information.

The driving information detection unit 12 may further include a speed detection unit that detects rotational speed of a vehicle powertrain, and the rotational speed of the vehicle powertrain (powertrain speed) may include rotational speed of a motor (motor speed) and rotational speed of a driving wheel 43 (driving wheel speed). Additionally, the rotational speed of the vehicle powertrain (powertrain speed) may further include rotational speed of a drive shaft (drive shaft speed).

The speed detection unit includes a motor speed detection unit installed in the motor and a wheel speed detection unit installed in the driving wheel 43, and the motor speed detection unit may be a conventional resolver or an equivalent hardware, and the wheel speed detection unit may be a conventional wheel speed sensor, a wheel speed detection sensor, or an equivalent hardware. In addition, the speed detection unit may further include a sensor capable of detecting the drive shaft speed. Additionally, the vehicle driving information further includes the rotational speed of the vehicle powertrain (driving wheel speed), and the rotational speed of the vehicle powertrain becomes vehicle state information among the vehicle driving information.

Meanwhile, among the configurations of the apparatus shown in FIG. 3, the first controller 20 determines, generates, and outputs a torque command for controlling the operation of the driving device 41 based on real-time vehicle driving information. Here, the driving device 41 is a motor that drives the vehicle.

The first controller 20 includes: a basic torque command generation unit 21 that determines a driver demand torque from the real-time vehicle driving information acquired through the driving information detection unit 12 and generates a basic torque command for generating the determined driver demand torque.

In addition, the first controller 20 further includes: a virtual effect creation control unit 22 that determines tooth surface pressure of a powertrain gear based on real-time state information of a powertrain and generates a virtual effect command for generating and implementing a virtual effect using the determined tooth surface pressure of the powertrain gear.

In the present disclosure, the gear tooth surface pressure of the powertrain may be determined using the shaft torsional speed, backlash speed, and input torque in the powertrain, which are powertrain state information, as will be described later. As the input torque, a motor torque command, that is, a basic torque command determined by the basic torque command generation unit 21 may be used.

Since the shaft torsional speed and the backlash speed may also calculated using the motor speed and wheel speed (driving wheel speed) along with the motor torque command, as will be described later, it can be said that the shaft torsional speed and the backlash speed, which are powertrain state information, are also determined from the real-time vehicle driving information.

Moreover, the first controller 20 further includes: a final torque command generation unit 23 that generates and outputs a final torque command using the basic torque command output from the basic torque command generation unit 21 and the virtual effect command output from the virtual effect creation control unit 22.

The final torque command is transmitted to the second controller 30, and the second controller 30 controls the operation of the driving device 41 for driving the vehicle according to the final torque command. Here, the driving device 41 is a motor that drives the vehicle.

As shown in FIG. 3, the torque and rotational force output by the motor, which is the driving device 41, is decelerated by the reducer 42 and then transmitted to the driving wheel 43, and when the operation of the motor is controlled by the second controller 30 according to the final torque command of the first controller 20, a virtual powertrain characteristics of an internal combustion engine may be realized.

At this time, the final torque command generated and output by the first controller 20 is a motor torque command capable of realizing virtual internal combustion engine powertrain characteristics, and when the operation of the motor, which is the driving device 41 of the vehicle, is controlled according to the final torque command, the output of the motor torque that may induce vehicle vibration and vehicle behavior corresponding to the tooth surface pressure of the powertrain gear during vehicle driving may be made.

In the present disclosure, the first controller 20 may be a vehicle control unit (VCU) that generates a motor torque command based on vehicle driving information in a typical electric vehicle, and the second controller 30 may be a motor control unit (MCU) that controls the operation of the motor according to the motor torque command. The first controller 20 (the vehicle control unit (VUC)) and the second controller 30 (the motor control unit (MUC)) according to an exemplary embodiment of the present disclosure may be a hardware device implemented by various electronic circuits (e.g., computer, microprocessor, CPU, ASIC, circuitry, logic circuits, etc.). The first controller 20 and the second controller 30 may be implemented by a non-transitory memory storing, e.g., a program(s), software instructions reproducing algorithms, etc., which, when executed, performs various functions of sub units (the basic torque command generation unit 21, the virtual effect creation unit 22, and the final torque command generation unit 23, etc.). The processor configured to execute the program(s), software instructions reproducing algorithms, etc. Herein, the memory and the processor may be implemented as separate semiconductor circuits. Alternatively, the memory and the processor may be implemented as a single integrated semiconductor circuit. The processor may embody one or more processor(s).

In the present disclosure, the virtual effect creation control unit 22 is a novel component that determines, generates, and outputs a virtual effect signal (command) for generating and implementing virtual vibration and virtual sound, separately from the basic torque command generation unit 21 and the basic torque command generated by the basic torque command generation unit 21, and may be added as part of the vehicle control unit (VCU) or provided as a control element separate from the vehicle controller.

Here, the virtual effect signal may be a signal of a waveform having the magnitude (amplitude and volume) of the virtual effect corresponding to the tooth surface pressure of the powertrain gear, like the virtual effect signal for the operation of a vibration device 51 or a sound device 54, as will be described later.

In the final torque command generation unit 23, the basic torque command input from the basic torque command generation unit 21 is corrected by the virtual effect command input from the virtual effect creation control unit 22, and at this time, a correction may be made by adding the virtual effect command to the basic torque command transmitted from the basic torque command generation unit 21, and the corrected torque command becomes the final torque command for motor control.

In the present disclosure, the virtual effect command may be regarded as a virtual effect signal for generating a virtual effect emulating the powertrain characteristics of an internal combustion engine vehicle. The virtual effect command, which is the virtual effect signal, is reflected in the final torque command, and the operation of the motor is controlled according to the final torque command to which the virtual effect command is reflected, and thus the virtual effect emulating the powertrain characteristics of an internal combustion engine vehicle, that is, virtual vibration, may be generated by the motor.

Accordingly, in the present disclosure, virtual vibration linked to the tooth surface pressure of the powertrain gear may be generated by the motor driving the vehicle, and the virtual vibration is vibration that mimic the vibration that may occur in existing internal combustion engine vehicles.

In this case, the motor is a driving device for driving the vehicle, but also functions as a virtual effect generation device capable of generating a virtual effect.

The apparatus for virtualizing characteristics of an internal combustion engine vehicle according to the present disclosure may further include: an interface unit 11 used by a driver to select and input one of ON and OFF of the virtual effect implementation function.

In the present disclosure, a means for a driver to selectively operate ON and OFF in the vehicle and output an electrical signal according to ON and OFF may be used as an interface unit 11. For example, it may be a manipulation device such as a button or a switch provided in a vehicle, or an input device or a touch screen of an AVN (audio, video and navigation) system.

The interface unit 11 may be connected to the first controller 20, and more specifically, the first controller 20 may also be connected to the virtual effect creation control unit 22, which will be described later. Accordingly, when there is an ON or OFF manipulation of the driver through the interface unit 11, the ON or OFF signal from the interface unit 11 may be input to the virtual effect creation control unit 22 of the first controller 20. Eventually, the virtual effect creation control unit 22 of the first controller 20 may recognize the ON or OFF manipulation state of the virtual effect implementation function by the driver.

In the present disclosure, the virtual effect implementation function is executed only when the driver inputs ON of the virtual effect implementation function through the interface unit 11. In addition, when the interface unit 11 is an input device installed in a vehicle, a mobile device (not shown) may be used as the interface unit 11, although not shown in FIG. 3, instead of the input device of the vehicle, and the ON and OFF manipulation of the virtual effect implementation function may also be performed by the driver using the mobile device.

The mobile device needs to be capable of being communicatively connected to an in-vehicle device, for example, the first controller 20, and to this end, an input/output communication interface (not shown) for communication connection between the mobile device and the first controller 20 is used.

In addition, the driver may set virtual effect application conditions such as set values using the interface unit 11, and when the virtual effect application condition is satisfied, the virtual effect implementation function according to the present disclosure may be performed (see step S1 in FIG. 4).

The apparatus for virtualizing characteristics of an internal combustion engine vehicle according to the present disclosure may further include: at least one of the vibration device 51 for generating virtual vibrations and the sound device 54 for generating and outputting virtual sounds.

The vibration device 51 and the sound device 54 are also virtual effect generating devices for generating virtual effects. In the present disclosure, one of a motor that is the driving device 41 and the vibration device 51 among the virtual effect generating devices may be used to generate virtual vibrations.

As described above, in the present disclosure, although virtual vibrations may be generated using a motor for moving a vehicle, a virtual vibration may be generated using a separate vibration device 51 installed in the vehicle instead of the motor.

The vibration device 51 is provided to generate vibrations according to an electrical signal output from the virtual effect creation control unit 22 of the first controller 20, that is, a virtual effect signal for generating and implementing virtual effects.

The vibration device 51 may include: a vibration amplifier 52 that receives a virtual effect signal and outputs an amplified vibration signal; and a vibration actuator 53 for generating vibrations by the amplified vibration signal output from the vibration amplifier 52.

As the vibration amplifier 52 and the vibration actuator 53, a well-known vibration amplifier and vibration actuator may be used. Additionally, the vibration actuator 53 of the vibration device 51 may be installed at a predetermined position in the vehicle where the driver may sense the vibration generated therefrom.

For example, the vibration actuator 53 of the vibration device 51 may be installed on the vehicle body or the seat, and may be installed at a position where vibration generated during driving may be transmitted to the driver through the vehicle body or the seat.

The sound device 54 is provided to generate a sound according to an electric signal output from the virtual effect creation control unit 22 of the first controller 20, that is, a virtual effect signal for generating and implementing a virtual effect.

The sound device 54 may include: a sound amplifier 55 that receives a virtual effect signal and outputs an amplified sound signal; and a speaker 56 for generating and outputting sound by the amplified sound signal output from the sound amplifier 55.

As the sound amplifier 55 and the speaker 56, well-known sound amplifiers and speakers may be used, and those already installed in the vehicle may be used. The speaker 56 may be a speaker mounted to output sound to the inside or outside of the vehicle.

Hereinafter, a method of generating virtual vibration and sound according to the present disclosure will be described in detail.

First, the virtual effect creation control unit 22 of the first controller 20 acquires information on tooth surface pressure of the powertrain gear (hereinafter abbreviated as "gear tooth surface pressure"), and the magnitude of the virtual effect, that is, the amplitude of the virtual vibration and the volume of the virtual sound (which is the amplitude in the waveform of the virtual sound signal) may be determined to be proportional to the size of the acquired gear tooth surface pressure (step S2 in FIG. 4).

When the magnitude of the virtual effect, that is, the amplitude of the virtual vibration and the volume of the virtual sound, is obtained as described above, the waveform of the virtual effect signal may be determined in real time (step S3 in FIG. 4). In addition, the determined virtual effect signal (or virtual effect command) may be transmitted to generate a virtual effect in the vibration device 51 (or motor) and the sound device 54 (see steps S4 and S5 of FIG. 4).

Figure 5:
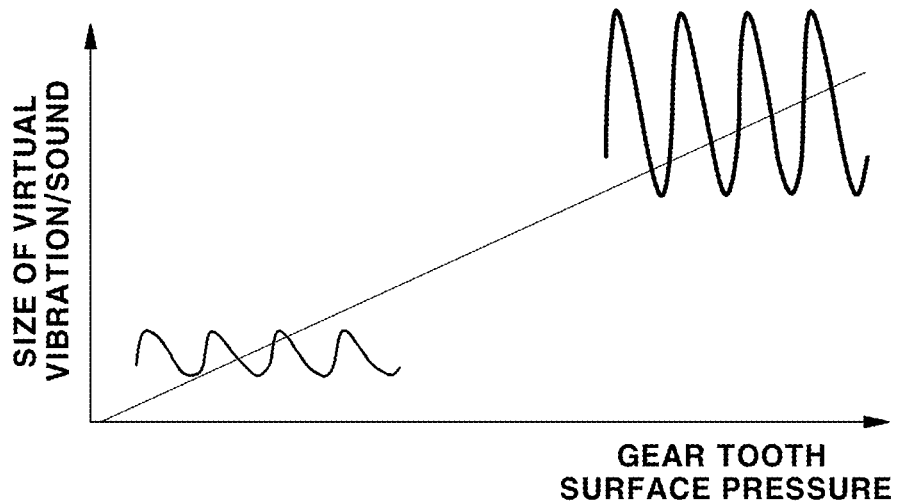
FIG. 5 is a diagram schematically showing waveforms and sizes of a virtual vibration signal and a virtual sound signal according to a gear tooth surface pressure in the present disclosure.

FIG. 5 is a diagram schematically showing waveforms and sizes of a virtual vibration signal and a virtual sound signal according to a gear tooth surface pressure in the present disclosure. The magnitude of the illustrated waveform is the amplitude of the virtual vibration and the volume of the virtual sound (which is the amplitude of the waveform).

In general, it is natural that the transmission of actual vibration becomes easier when the size of the gear tooth surface pressure increases. In order to emulate this, as the absolute value of the tooth surface pressure of the gear in the powertrain, that is, as the gear tooth surface pressure increases, it is possible to increase the amplitude of the vibration or the volume of the sound (the amplitude of the waveform) in proportion to the absolute value of the gear tooth surface pressure (see FIGS. 9 and 11 to be described later).

In addition to increasing proportionally as described above, it is also effective to make the gear tooth surface pressure and the increase/decrease direction of the virtual effect (virtual vibration and virtual sound) coincide with each other. That is, as the gear tooth surface pressure increases, the size of the virtual effect also increases, or as the gear tooth surface pressure decreases, the size of the virtual effect also decreases.

In other words, the amplitude of the virtual effect may have a function of monotonically increasing or monotonically decreasing with respect to the gear tooth surface pressure.

Moreover, when the gear tooth surface pressure is the pressure set as belonging to the backlash region, the amplitude of the virtual vibration and the volume of the virtual sound may be set to the minimum. At this time, zero (0) may be set as the pressure in the backlash region. That is, the area where the gear tooth surface pressure is zero may be referred to as the backlash region.

Figure 6:
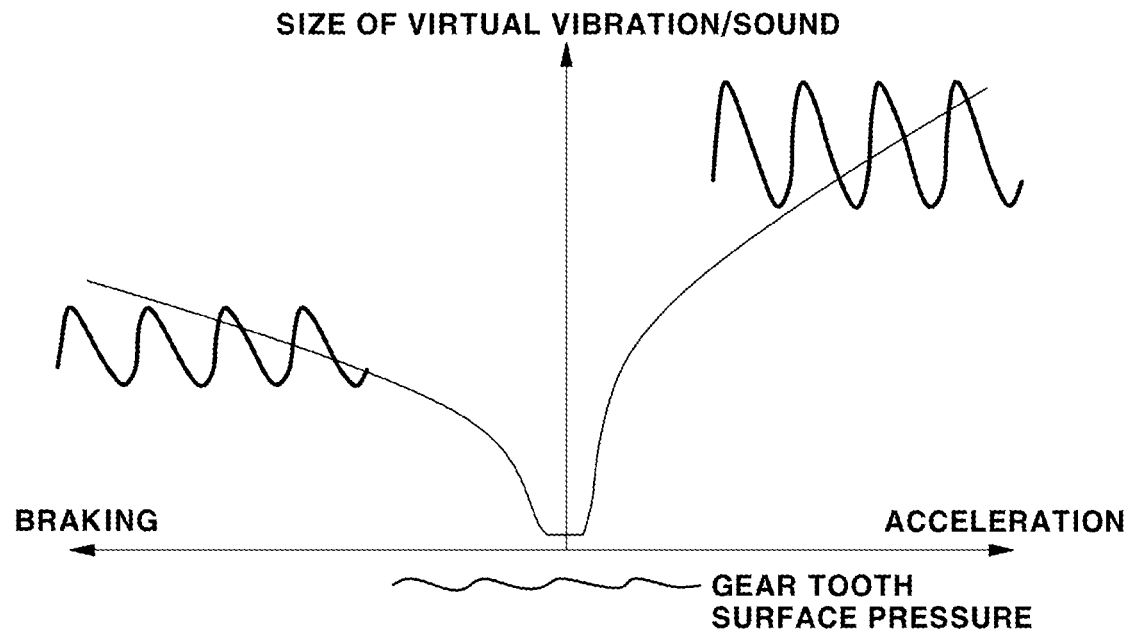
FIG. 6 is a diagram showing waveforms and sizes of the virtual vibration signal and the virtual sound signal when the gear tooth surface pressure is zero (0) in the present disclosure.

FIG. 6 is a diagram showing waveforms and sizes of virtual vibration signals and virtual sound signals when the gear tooth surface pressure is zero in the present disclosure. The magnitude of the illustrated waveform is the amplitude of the virtual vibration and the volume of the virtual sound (which is the amplitude of the waveform).

When gear backlash actually occurs in the powertrain, it can be considered that the physical coupling between the gears is stopped. In this case, the actual vibration will not be transmitted to the powertrain, but will be transmitted to the surrounding lubricant, machine parts shaft, housing, etc., and will have damping characteristics. Thus, as a strategy for generating a virtual effect that realistically emulates such an effect, it is preferable to set the size of the virtual effect (virtual vibration and virtual sound) to be the set minimum value.

Accordingly, in the present disclosure, the virtual effect creation control unit 22 of the first controller 20 may determine the size of the virtual effect (the amplitude of the virtual effect signal) as a preset minimum value when the gear tooth surface pressure corresponds to the pressure in the preset backlash region.

Hereinafter, a method of obtaining tooth surface pressure information will be described in detail.

Figure 7:
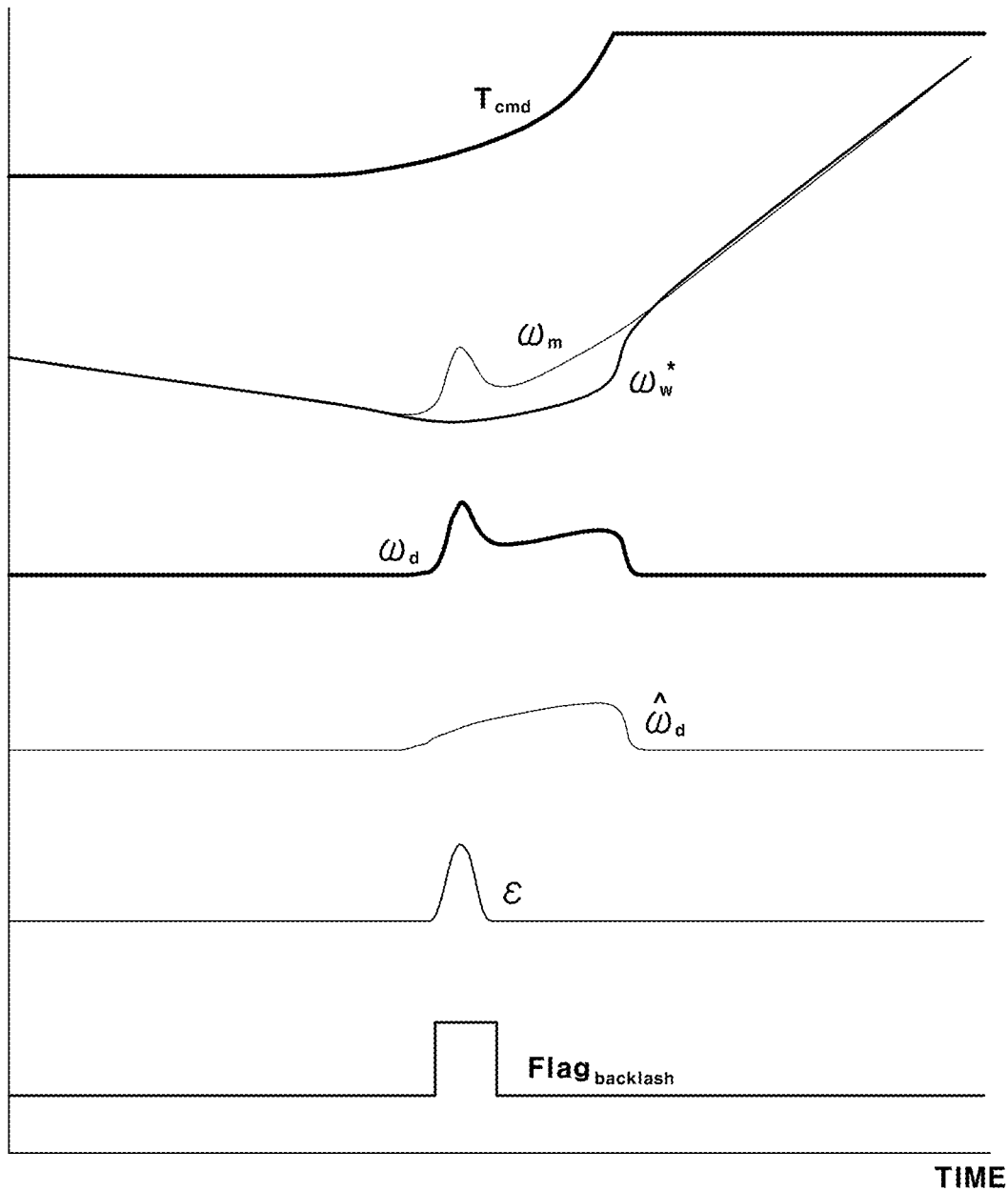
FIGS. 7 and 8 are diagram showing an example in which the gear tooth surface pressure is calculated in the present disclosure.
Figure 8:
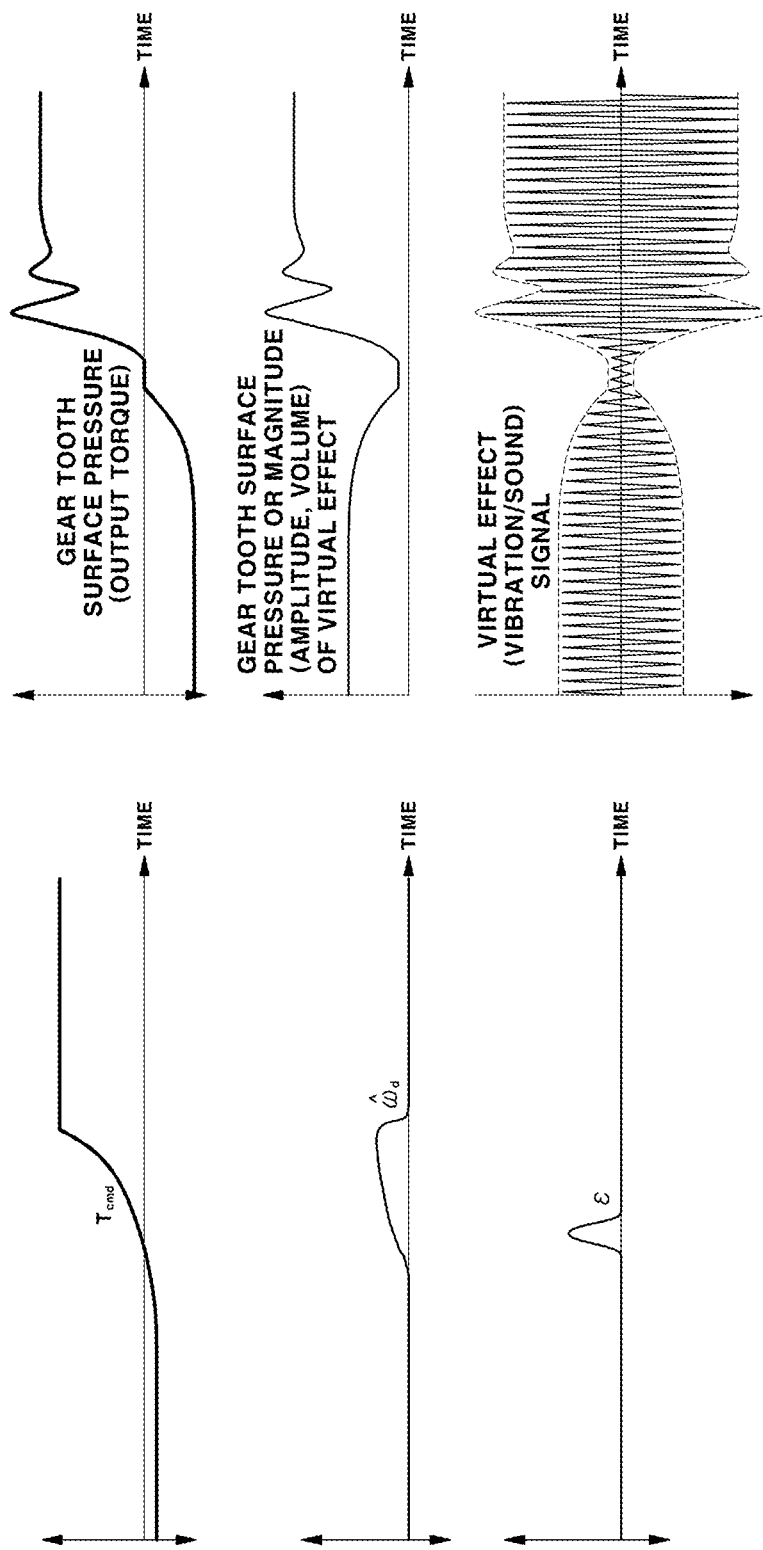

FIGS. 7 and 8 are views showing an example in which the gear tooth surface pressure is calculated in the present disclosure.

In the present disclosure, the gear tooth surface pressure is estimated using the backlash information, shaft torsion information, and input torque information in the powertrain, which are powertrain state information, and at this time, a preset formula capable of calculating the gear tooth surface pressure by using the powertrain state information as an input variable may be used.

That is, after the gear tooth surface pressure is estimated in real time using the current backlash information, shaft torsion information, and input torque information to express the typical powertrain characteristics with backlash characteristics, it is possible to determine the magnitude (amplitude and volume) of the virtual effect from the obtained gear tooth surface pressure.

The input torque is a torque applied to the powertrain from the motor, and the values below may be used to estimate the gear tooth surface pressure as the input torque.

1. Motor torque command as input torque command (basic torque command)
2. Estimate of input torque (motor torque)
3. Input torque detection value detected by sensor
4. Filter applied value to input torque The input torque means a torque of a main torque source that generates a torque for driving the vehicle and applies it to the powertrain, and in this case, a command value may be used as the input torque. Since the main torque source is the driving device 41 for driving the vehicle, and the driving device, which is the main torque source in the electric vehicle, is a motor, the command may be a motor torque command (final torque command) as an input torque command.

On the other hand, the input torque may be an input torque (motor torque) estimate obtained from a motor control unit (MCU), or may be a motor torque detection value detected by a torque sensor. Here, the motor torque detection value is the detection value of the torque sensor installed on the input side of the powertrain gear, such as a reducer, or on the motor output side. The input torque may also be a value to which a filter is additionally applied.

In the present disclosure, the gear tooth surface pressure may be estimated by further using the speed (powertrain speed) measured in the powertrain. To be specific, the gear tooth surface pressure may be estimated by further using information corresponding to the speed difference between one side and the other side in the powertrain.

When there is different rotational speed information in relation to the motor speed and wheel speed in the powertrain between the motor, which is the driving device 41, and the driving wheels 43, the gear tooth surface pressure may be estimated by using the difference ("powertrain rotational speed difference").

In the powertrain in a vehicle, in the path through which the driving force and torque of the motor, which is the driving device 41, when there is powertrain speed information corresponding to the upstream side and powertrain speed information corresponding to the downstream side based on the gear element in the powertrain such as the reducer, and there is a difference between the upstream-side powertrain speed and the downstream-side powertrain speed ("powertrain rotational speed difference"), the gear tooth surface pressure corresponding to the difference may be estimated.

At this time, the difference between the upstream-side powertrain speed and the downstream-side powertrain speed may be a difference between the powertrain speed on the one side and the converted powertrain speed on the other side when the powertrain speed on the one side (e.g. downstream side) is converted to the powertrain speed on the other side (e.g. upstream side) of the powertrain by using the gear ratio. The converted powertrain speed on the other side may be a speed equivalent to the powertrain speed on the one side, and the difference between the speeds of the both sides of the powertrain will be referred to as a "powertrain rotational speed difference" hereinafter.

For example, when the powertrain speed on the one side is the driving wheel speed (measured wheel speed), which is the downstream-side powertrain speed detected by a speed detection unit (wheel speed sensor) of the driving information detection unit 12 while the powertrain speed on the other side is the motor speed (measured motor speed), which is the upstream-side powertrain speed detected by the speed detection unit (resolver) of the driving information detection unit 12, the powertrain rotational speed difference may be the difference between the detected motor speed (measured motor speed) and the equivalent wheel speed.

The equivalent wheel speed is a speed obtained by converting the detected driving wheel speed (measured wheel speed) into a speed from the motor perspective using the gear ratio between the motor and the driving wheels. That is, the equivalent wheel speed is the speed at which the measured wheel speed is converted to the speed at the motor, which is the wheel speed equivalent to the motor speed.

When the equivalent wheel speed is calculated in this way, the powertrain rotational speed difference that is a difference between the motor speed (measured motor speed) detected by the speed detection unit and the equivalent wheel speed may be calculated.

In an embodiment of the present disclosure, information on shaft torsion in the powertrain used to determine the gear tooth surface pressure among the powertrain state information may include a shaft torsional speed. The shaft torsional speed may be calculated by the virtual effect creation control unit 22 of the first controller 20.

That is, the virtual effect creation control unit 22 of the first controller 20 may determine the powertrain spring stiffness through a calculation process by a formula using the determined powertrain rotational speed difference and the motor torque command after determining the difference in the powertrain rotational speed difference as described above, and may determine the shaft torsional speed from the determined powertrain spring stiffness and the motor torque command.

The shaft torsional speed corresponds to the information on shaft torsion among the powertrain state information for determining the gear tooth surface pressure in the embodiment of the present disclosure, and is used to estimate the gear tooth surface pressure together with the backlash speed and input torque to be described later in the embodiment of the present disclosure.

The shaft torsional speed may be determined as a value obtained by multiplying the powertrain spring stiffness and the motor torque command, and the motor torque command is a basic torque command determined by the basic torque command generation unit 21 of the first controller 20.

It has been previously described that the basic torque command generation unit 21 of the first controller 20 determines the basic torque command based on vehicle driving information acquired through the driving information detection unit 12.

In the embodiment of the present disclosure, information on backlash in the powertrain used to determine the gear tooth surface pressure among the powertrain state information may include a backlash speed. The backlash speed may be determined on the basis of the powertrain rotational speed difference value and the shaft torsional speed.

In the embodiment of the present disclosure, the backlash speed may be determined as a difference value between the powertrain rotational speed difference value and the shaft torsional speed, and specifically, as a value obtained by subtracting the shaft torsional speed from the powertrain rotational speed difference value.

Preferably, in the embodiment of the present disclosure, the backlash speed may be determined as a value obtained by filtering the value obtained by subtracting the shaft torsional speed from the powertrain rotational speed difference value. At this time, the filtering may be performed by a high pass filter, and by high-pass filtering the value obtained by subtracting the shaft torsional speed from the powertrain rotational speed difference value, the backlash speed may be obtained.

The virtual effect creation control unit 22 of the first controller 20 may determine whether backlash occurs by comparing the determined backlash speed with a set backlash determination threshold. In addition, the virtual effect creation control unit 22 of the first controller 20 may generate a backlash flag indicating whether backlash occurs according to the determination result.

Hereinafter, a method of calculating the powertrain rotational speed difference, shaft torsional speed, and backlash speed will be described with reference to the equations.

Equation 1 below is an equation for calculating the rotational speed difference.

$$\omega_d = \omega_m - \omega_w^* \quad \text{[Equation 1]}$$

Here, $\omega_m$ in represents the motor speed detected by the speed detection unit (e.g. resolver) of the driving information detection unit 12, $\omega_w^*$ represents the equivalent wheel speed obtained by converting the wheel speed detected by the speed detection unit (wheel speed sensor) of the driving information detection unit 12 using a gear ratio. $\omega_d$ represents the difference between the motor speed and the equivalent wheel speed, which is the powertrain rotational speed difference.

When the powertrain rotational speed difference is obtained as described above, the powertrain spring stiffness value is calculated on the basis of the powertrain rotational speed difference ($\omega_d$) and the motor torque command information, and then the shaft torsional speed in the powertrain is calculated on the basis of the calculated powertrain spring stiffness value and the motor torque command (basic torque command) information.

Equation 2 below is an equation that may be used to estimate and calculate the powertrain spring stiffness value using the powertrain rotational speed difference and motor torque command information, and Equation 3 below is an equation that may be used to calculate the shaft torsional speed value.

In other words, after obtaining information on the powertrain spring stiffness from the powertrain rotational speed difference and the motor torque command (basic torque command) through the calculation process using Equations 2 and 3, the shaft torsional speed value may be calculated from the obtained information on the powertrain spring stiffness and the motor torque command.

$$\dot{\hat{k}}_{spr} = \text{deadzone}(K_u \times (1-\text{Flag}_{backlash}) \times (\omega_d \hat{k}_{spr} \times \dot{T}_{cmd})) \quad \text{[Equation 2]}$$

$$\hat{\omega}_d = \hat{k}_{spr} \times \dot{T}_{cmd} \quad \text{[Equation 3]}$$

In Equations 2 and 3, ^ (hat) represents an estimated value, and ˙ (dot) represents a differential value.

In Equation 2, $K_u$ denotes an update gain, which is a predetermined value, and an update gain of an appropriate value capable of distinguishing between normal torsion and backlash due to torque application is preset.

$\text{Flag}_{backlash}$ indicates the backlash flag, which is a backlash flag value finally determined in a previous determination period as feedback information, and is determined as a value of one (1) or zero (0) by Equation 7 as described below.

$\hat{k}_{spr}$ is the spring stiffness value (estimated value) to be obtained, that is, the powertrain spring stiffness for calculating the shaft torsional speed, and $T_{cmd}$ represents the motor torque command.

In Equation 2, deadzone (x) is a deadzone function defining that an output is zero (0) when x is within a predetermined range (deadband), and an output of x is obtained only when x is outside the range.

In addition, in Equation 3, $\hat{\omega}_d$ denotes an axis torsion speed (estimated value) to be obtained.

It was explained that the powertrain spring stiffness value is used to calculate the shaft torsional speed with reference to Equations 2 and 3 above. The powertrain spring stiffness value is repeatedly calculated in the same way every backlash judgment cycle and updated to a new value. However, it is also possible to update only the change amount of the spring stiffness, rather than updating the powertrain spring stiffness value.

In this case, Equations 2 and 3 may be replaced with Equations 4 and 5 below.

$$\dot{\tilde{k}}_{spr} = \text{deadzone}(K_u \times (1 - \text{Flag}_{backlash}) \times (\omega_d - (\overline{k}_{spr} + \tilde{k}_{spr}) \times T_{cmd})) \quad [\text{Equation 4}]$$

$$\hat{\omega}_d = (\overline{k}_{spr} + \tilde{k}_{spr}) \times T_{cmd} \quad [\text{Equation 5}]$$

In Equations 4 and 5, $\overline{k}_{spr} + \tilde{k}_{spr}$ represents the drive system spring stiffness, and among the values representing the powertrain spring stiffness, $\overline{k}_{spr}$ is a constant, and the part that is actually periodically obtained and updated every time backlash is determined is $\tilde{k}_{spr}$, which indicates the amount of change in spring stiffness.

Next, it is possible to determine the backlash speed using the powertrain rotational speed difference value and the shaft torsional speed, and then determine whether backlash occurs from the determined backlash speed.

Equation 6 below is an equation that may calculate the backlash speed using the powertrain rotational speed difference ($\omega_d$) value and the shaft torsional speed ($\hat{\omega}_d$)

$$\varepsilon = HPF(\omega_d - \hat{\omega}_d) \quad [\text{Equation 6}]$$

$$\text{Flag}_{backlash} = \begin{cases} 1, & \text{when } \varepsilon > \varepsilon_{threshold} \\ 0, & \text{when } \varepsilon \leq \varepsilon_{threshold} \end{cases} \quad [\text{Equation 7}]$$

In Equation 6, $\varepsilon$ represents the backlash speed. In the present disclosure, the backlash speed ($\varepsilon$) is defined as a value obtained by subtracting the shaft torsional speed ($\hat{\omega}_d$) from the rotational speed difference ($\omega_d$) value as shown in Equation 6.

Preferably, in the present disclosure, the backlash speed ($\varepsilon$) may be defined as a filtering value of a value obtained by subtracting the shaft torsional speed ($\hat{\omega}_d$) from the rotational speed difference ($\omega_d$) value, and in Equation 6, HPF(x) is a filtering function representing a filtering value of x, and specifically, a function representing a high-pass filtered value.

In Equation 6, the rotational speed difference ($\omega_d$) is the difference between the powertrain rotational speed, which is the difference value between the motor speed ($\omega_m$) and the equivalent wheel speed ($\omega_w^*$) calculated according to Equation 1 in the virtual effect creation control unit 22 of the first controller 20, and together with this rotational speed difference ($\omega_d$) value, the shaft torsional speed ($\hat{\omega}_d$) calculated by Equation 3 in the virtual effect creation control unit 22 of the first controller 20 is used to calculate the backlash speed ($\varepsilon$).

In Equation 7, $\varepsilon_{threshold}$ is a value preset in the virtual effect creation control unit 22 of the first controller 20 in order to determine whether backlash occurs on the basis of the backlash speed $\varepsilon$ calculated as in Equation 6, and indicates the backlash backlash determination threshold. In Equation 7, $\text{Flag}_{backlash}$ is a backlash flag indicating whether backlash occurs as a result of the backlash determination.

As shown in Equation 7, when the backlash speed ($\varepsilon$) exceeds the backlash determination threshold ($\varepsilon_{threshold}$), the controller determines that backlash has occurred, and generates and outputs the value 1 indicating the backlash section as the backlash flag ($\text{Flag}_{backlash}$) value.

Conversely, when the backlash speed ($\varepsilon$) is below the backlash determination threshold ($\varepsilon_{threshold}$), the controller determines that backlash has not occurred, and generates and outputs a value zero (0) indicating that the backlash does not occur as a backlash flag value.

As such, in the present disclosure, a section in which the backlash speed $\varepsilon$ defined as in Equation 6 is greater than a predetermined value (backlash determination threshold) may be determined as the backlash section in which the backlash occurs. That is, in the present disclosure, detection and determination of backlash may be made through a calculation process using Equations 1 to 7.

Referring to FIG. 7, variables for calculating the shaft torsional speed and the backlash speed and their calculated values, and the backlash flag generation state are exemplified in the embodiment of the present disclosure. Referring to FIG. 7, an example of the equivalent wheel speed ($\omega_w^*$) obtained from the motor torque command ($T_{cmd}$), the motor speed ($\omega_m$) as the detection speed, and the wheel speed as the detection speed can be seen.

In addition, FIG. 7 shows the powertrain rotational speed difference ($\omega_d$), which is the difference value between the motor speed ($\omega_m$) and the equivalent wheel speed ($\omega_w^*$), the shaft torsional speed ($\hat{\omega}_d$) calculated based on the powertrain rotational speed difference ($\omega_d$), the motor torque command ($T_{cmd}$), and the backlash speed ($\varepsilon$) obtained as the difference between the rotation speed difference ($\omega_d$) and the shaft torsional speed ($\hat{\omega}_d$).

Moreover, in FIG. 7, the backlash flag ($\text{Flag}_{backlash}$) value is exemplified as the powertrain backlash determination result, and as described above, the backlash flag ($\text{Flag}_{backlash}$) value is determined as a value of zero (0) or one (1) by comparing the backlash speed ($\varepsilon$) and the backlash determination threshold ($\varepsilon_{threshold}$).

Assuming that the gear ratio of the above powertrain does not change (when there is no shift), there are two major factors that cause the difference in the powertrain rotational speed, one of which is backlash in the powertrain, and the other is shaft torsion (compliance) in the powertrain.

In consideration of this, in the present disclosure, the gear tooth surface pressure may be estimated through the calculation process by the formula using the shaft torsional speed and the backlash speed determined as described above as input variables together with the input torque.

Equations 8 and 9 below are equations that can calculate the gear tooth surface pressure. In the embodiment of the present disclosure, the gear tooth surface pressure may be determined using Equation 8 or Equation 9.

$$\text{gear tooth surface pressure} = \text{Santuration} \begin{array}{l} \text{maximum value} \\ \text{minimum value} \end{array} \quad [\text{Equation 8}]$$

$$\text{gear tooth surface pressure} = \frac{(A \times T_{cmd} + B \times \text{shaft torsional speed} - C \times \text{backlash speed})}{} \quad [\text{Equation 9}]$$

$$\begin{cases} D \times T_{cmd} + E \times \text{shaft torsional speed}, & |\text{backlash speed}| \leq F \\ \text{minimum value or 0}, & |\text{backlash speed}| > F \end{cases}$$

In Equations 8 and 9, A, B, C, D, and E are preset values set in the controller (the virtual effect creation control unit of the first controller), and the "maximum value" and "minimum value" of the gear tooth surface pressure are also preset values. "Saturation( )" indicates limiting the values in ( ) to the maximum (upper limit) and minimum (lower limit) values, and the value in ( ) is determined as the maximum value, the minimum value, or a value in between.

In Equation 9, a state in which the backlash speed exceeds F means that the state of the powertrain is a backlash state, and a state in which the backlash speed is less than F means that the powertrain is in a normal state, not in a backlash state. F is a backlash determination threshold, which may be the same as or different from the backlash determination threshold ($\varepsilon_{threshold}$) of Equation 7.

In this way, when the gear tooth surface pressure corresponding to the current powertrain state information is calculated and estimated after the powertrain state information is determined, the magnitude of the virtual effect corresponding to the gear tooth surface pressure, that is, the amplitude of the virtual vibration and the volume of the virtual sound may be set using the calculated gear tooth surface pressure.

Referring to FIG. 8, the gear tooth surface pressure, the magnitude of the virtual effect, and the virtual effect signal are exemplified in addition to the motor torque command ($T_{cmd}$) that is the input torque, the shaft torsional speed ($\hat{\omega}_d$), and the backlash speed ($\varepsilon$).

The magnitude of the virtual effect, that is, the amplitude of the virtual vibration and the volume of the virtual sound, may be obtained from a map with the gear tooth surface pressure as input. Alternatively, after obtaining a value proportional to the absolute value of the gear tooth surface pressure by scaling the size (absolute value) of the information on the gear tooth surface pressure, set minimum value, that is, minimum amplitude or minimum volume value may be added to the obtained value.

Figure 9:
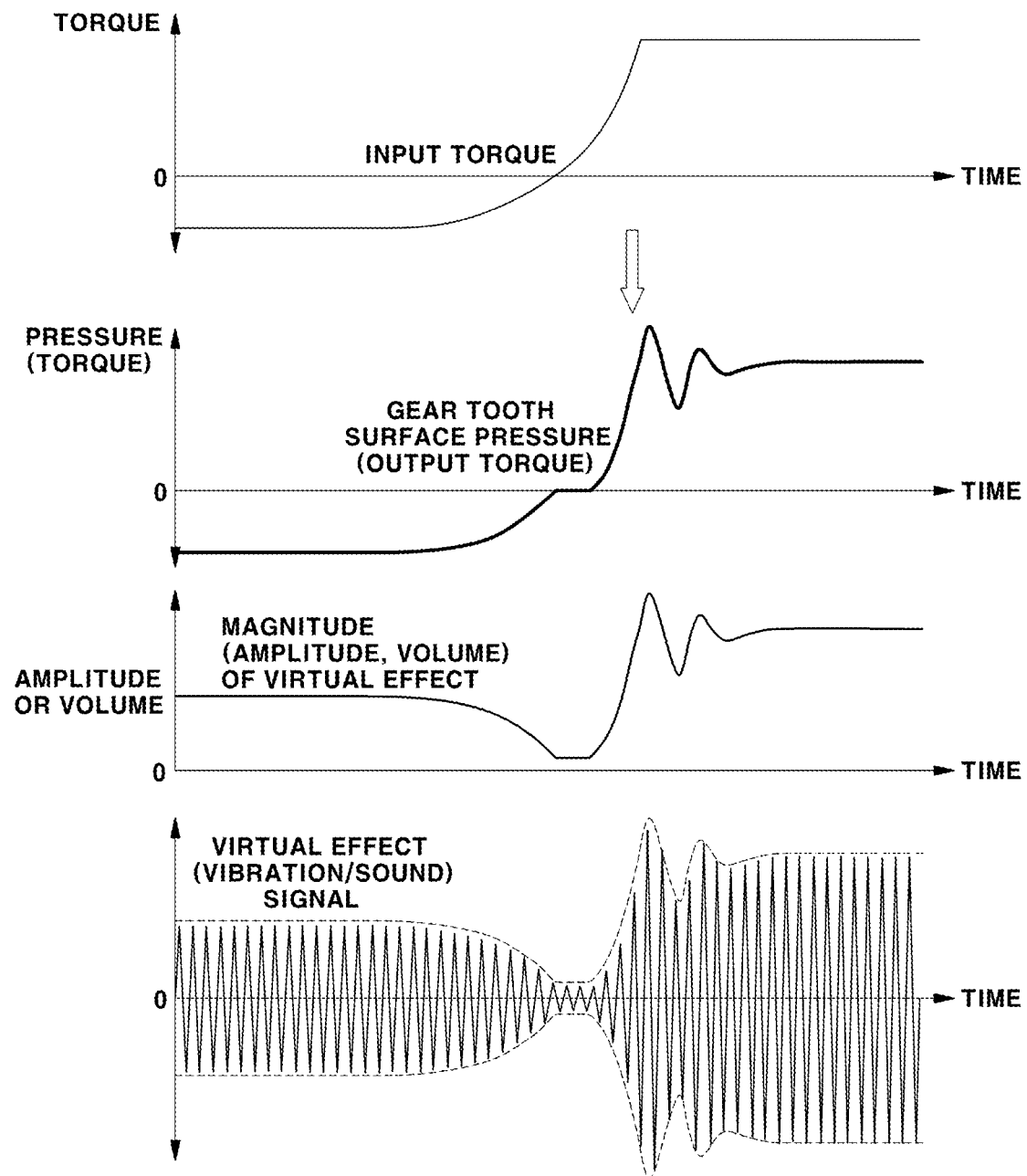
FIG. 9 is a diagram showing an example in which a virtual vibration and a virtual sound are changed in real time in the present disclosure.

FIG. 9 shows that the virtual effect, that is, virtual vibration and virtual sound, changes in real time in the same way as described above. As shown in FIG. 9, the virtual effect creation control unit 22 of the first controller 20 may determine the size of the virtual effect as a value proportional to the absolute value of the gear tooth surface pressure.

In the present disclosure, the input torque may be a motor torque, and the motor torque may be a motor torque command. In Equations 2 to 5 and 8, 9, the motor torque command ($T_{cmd}$) may be replaced with an estimated motor torque or a detected value or a filter applied value thereof.

In the case of generating virtual vibration and virtual sound as a virtual effect using the vibration device 51 and the sound device 54 as a virtual effect generating device, the motor torque command is a basic torque command determined by the basic torque command generation unit 21 of the first controller 20.

In addition, the amplitude of the virtual vibration and the volume (amplitude of the waveform) of the virtual sound may be determined from the calculated gear tooth surface pressure by a map or the like, and then a virtual effect signal may be generated with the waveform of the determined amplitude.

After all, the vibration of the virtual effect may be generated in the vibration device 51 by the virtual effect signal, and similarly, the sound of the virtual effect may be generated and output in the sound device 54 by the virtual effect signal.

In the present disclosure, instead of using the vibration device 51 to generate virtual vibration, a motor that is a driving device 41 for driving a vehicle may be used as a virtual effect generating device to generate virtual vibration.

To this end, even when the virtual effect creation control unit 22 of the first controller 20 generates a virtual effect command (virtual effect signal) indicating the waveform of the determined amplitude, and the motor is used as a virtual effect generating device, the motor torque command among input torques to determine gear tooth surface pressure is a basic torque command determined by the basic torque command generation unit 21 of the first controller 20.

The final torque command generation unit 23 of the first controller 20 uses the virtual effect command to correct the basic torque command generated by the basic torque command generation unit 21 of the first controller 20.

For example, when the basic torque command generation unit 21 of the first controller 20 generates a basic torque command based on real-time vehicle driving information and the virtual effect creation control unit 22 generates a virtual effect command, the final torque command generation unit 23 may generate the final torque command by adding the basic torque command input from the basic torque command generation unit 21 and the virtual effect command input from the virtual effect creation control unit 22.

When the second controller 30 controls the operation of the motor, which is the driving device 41 of the vehicle, according to the final torque command generated in this way, vibration emulating vibration of an internal combustion engine vehicle (virtual vibration) may be generated and provided by the motor.

Meanwhile, in an embodiment of the present disclosure, it is possible to binarize the waveform of the virtual effect. That is, the shape and position of the tooth surfaces may vary depending on the shape profile design of the actual gear, and the vibration profile may change depending on the shape and position of these tooth surfaces or the magnitude and direction of the transmitted torque. Thus, in order to emulate this effect, the change in the vibration profile may also be reflected in the virtual vibration and virtual sound profiles.

First, the type of profile in the virtual vibration signal and virtual sound signal waveform may be changed depending on the amount of torque transmitted by the powertrain gear. For example, it may be made to gradually change from profile 1 to profile 2 as the magnitude of the torque increases.

Alternatively, the type and amplitude of the profile of the virtual vibration signal and the virtual sound signal waveform may be binarized depending on the direction of the torque. For example, profile 1 may be used when a forward torque is applied, and profile 2 may be used when a reverse torque is applied.

At this time, if profile 1 is defined as a vibration profile when a forward torque is applied and profile 2 is defined as a vibration profile when a reverse torque is applied, the frequency component of profile 1 may be said to be more heterogeneous than the frequency component of profile 2. That is, the frequency component of profile 2 is more homogeneous than the frequency component of profile 1.

In the waveforms of the virtual vibration signal and the virtual sound signal, the reason for setting the different profiles of the waveforms when the forward torque is applied and when the reverse torque is applied as described above is because, when analyzing the vibration characteristics of the powertrain to which the internal combustion engine, which is the actual emulation target, is applied, there is an explosion stroke of the engine while generating forward torque, and in the case of forward torque generation (fired) that goes through the process of suction-compression-explosion-exhaust compared to the case of reverse torque generation (motored) that simply goes through the process of suction-compression-expansion-exhaust, the vibration component due to the explosion is added, and the frequency component is eventually mixed.

Moreover, a peak shape among the waveforms of the profile 1 may be a sharper shape than a peak shape among the waveforms of the profile 2. That is, the heterogeneous frequency component of profile 1 is higher than the primary frequency band of profile 2.

Figure 10:
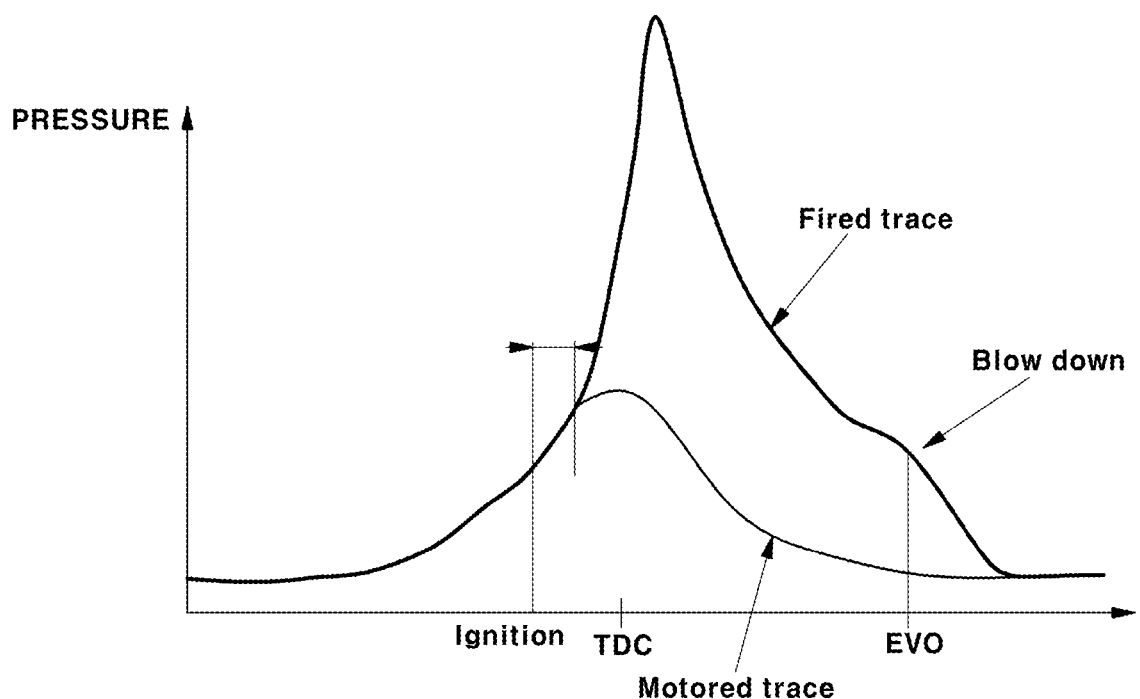
FIG. 10 is a diagram showing a cylinder pressure state of an internal combustion engine.

The reason for differentiating in the peak shape of the waveform when applying the forward torque and when applying the reverse torque as described above is to emulate the effect of the explosion. Referring to FIG. 10, it can be seen that a high-frequency component is added in the "fired trace" (forward torque generation) compared to the "motored trace" (reverse torque generation) in the cylinder pressure state of a typical gasoline engine.

Figure 11:
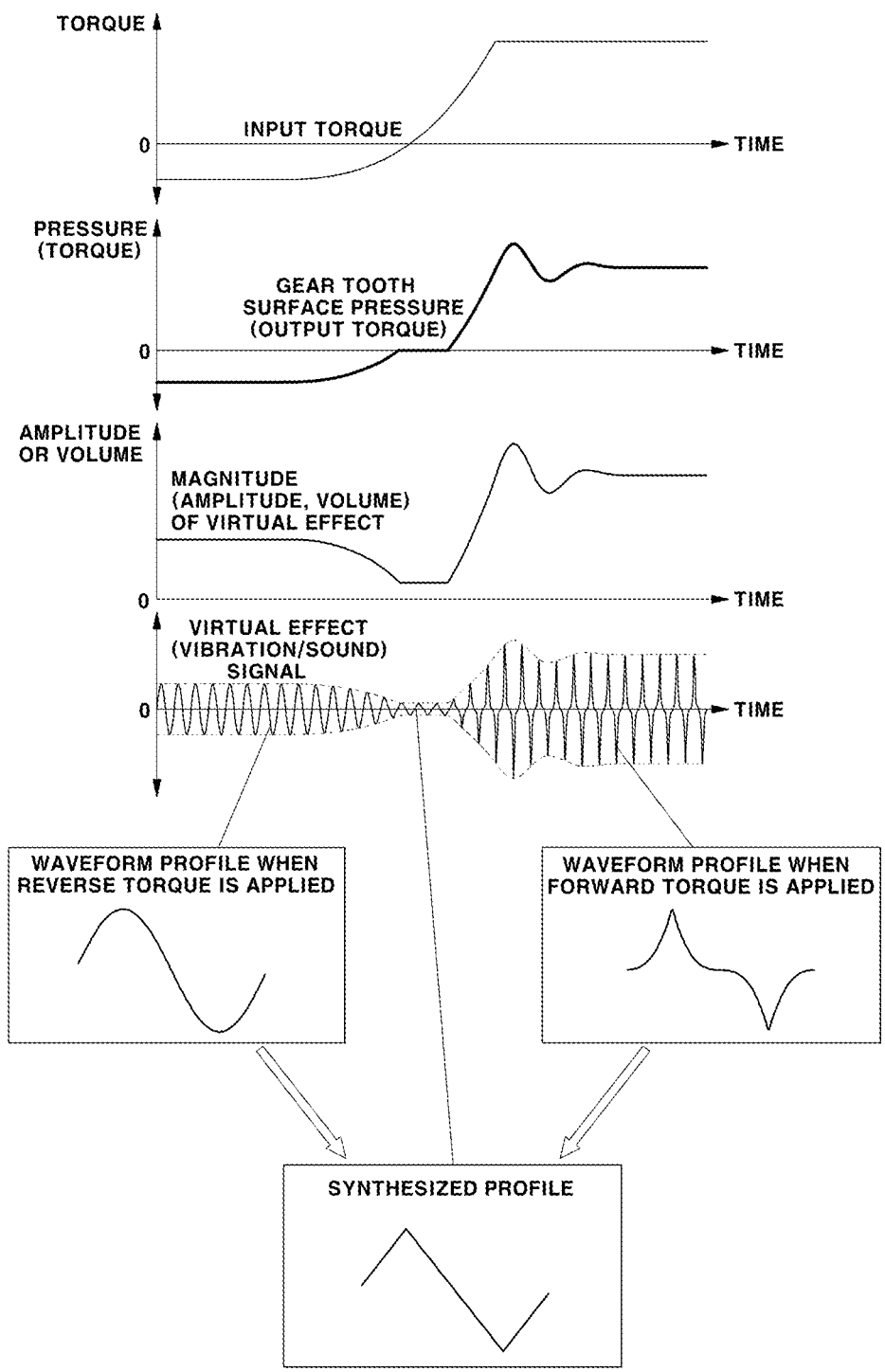
FIG. 11 is a diagram showing an example of changing the size and shape in real time in the waveform of virtual effects after the gear tooth surface pressure is calculated in the present disclosure.

FIG. 11 is a view showing an example of changing the size and shape in real time in the waveform of virtual effects after the gear tooth surface pressure is calculated in the present disclosure. In the present disclosure, the virtual effect includes virtual vibration and virtual volume as described above. Additionally, the size of the waveform corresponds to the amplitude of the vibration and the volume of the sound.

Referring to FIG. 11, it can be seen that the vibration profile is set separately when reverse torque is applied and when forward torque is applied. As shown, the profile of the waveform when the reverse torque is applied and the profile of the waveform when the forward torque is applied may be preset with different peak shapes.

In the example of FIG. 11, the input torque is converted from the reverse torque, which is a negative (−) torque, to the forward torque, which is a positive (+) torque, and at this time, the gear tooth surface pressure also converts from negative torque and pressure to positive torque and pressure. The negative (−) torque is a torque that decelerates the vehicle, and the positive (+) torque is a torque that accelerates the vehicle.

As shown in FIG. 11, after the gear tooth surface pressure is calculated, the magnitude of the virtual effect, that is, the amplitude of the virtual vibration and the volume of the virtual sound, may be obtained based on the calculated gear tooth surface pressure. At this time, the amplitude of the virtual vibration and the volume of the virtual sound that change in real time in association with the gear tooth surface pressure may be obtained.

When the amplitude of the virtual vibration and the volume of the virtual sound linked to the real-time gear tooth surface pressure are obtained as described above, the set profile of the waveform when the forward torque is applied and the set profile of the waveform when the reverse torque is applied are applied, and yet, a virtual vibration signal of a waveform whose amplitude changes in real time and a virtual sound signal of a waveform whose volume changes in real time may be determined.

To sum up, when the virtual effect creation control unit 22 of the first controller 20 generates and outputs a virtual vibration signal and a virtual sound signal according to the above method, the vibration device 51 and the sound device 54 may generate and output the vibration and sound according to the virtual vibration signal and the virtual sound signal as described above.

In the example of FIG. 11, in the backlash section in which the gear tooth surface pressure becomes zero (0), a profile obtained by combining the profile at the time of applying the forward torque and the profile at the time of applying the reverse torque may be used. At this time, the two profiles may be synthesized using a method of multiplying the waveform values of the two profiles by weights ($\alpha$, 1−$\alpha$) and then summing the two values each multiplied by weights.

The weight a may be determined by a map using the input torque as an input. That is, from the input torque or the output torque, the corresponding weight a may be determined by the map, and when the weight a is determined, one profile may be obtained by applying and synthesizing $\alpha$ and 1−$\alpha$ to two types of profiles.

Referring to FIG. 11, one profile synthesized (synthesized in a ratio of 5:5) by applying a weight $\alpha$=0.5 to each of the profile of the waveform when the reverse torque is applied and the profile of the waveform when the forward torque is applied is exemplified.

Thus far, a method of virtualizing characteristics of an internal combustion engine vehicle in an electric vehicle according to an embodiment of the present disclosure has been described in detail.

According to the method of virtualizing characteristics of an internal combustion engine vehicle of the present disclosure, it is possible to generate and provide virtual vibrations and virtual sounds that are linked to the tooth surface pressure of the powertrain gear. Accordingly, the characteristics of the virtual internal combustion engine powertrain may be created and realized in an electric vehicle with vibration and sound, and the realism of the virtual effect may be maximized.

Furthermore, it is possible to provide a driver with a more realistic feeling of operation and driving similar to that of the internal combustion engine powertrain, and to greatly improve the vehicle's marketability by providing highly realistic virtual effects. In addition, the driver can experience the driving sensibility, fun, excitement, and direct shift feeling provided by the internal combustion engine powertrain in his or her vehicle without having to switch to an internal combustion engine vehicle.

Although the embodiments of the present disclosure have been described in detail above, the scope of the present disclosure is not limited thereto, and various modifications and improvements by those skilled in the art using the basic concept of the present disclosure as defined in the following claims are also included in the scope of the present disclosure.

What is claimed is:

1. A method of virtualizing characteristics of an internal combustion engine vehicle in an electric vehicle, the method comprising:
   obtaining, by a controller, powertrain state information for a vehicle powertrain including a motor that makes a vehicle move and a power transmission device between the motor and driving wheels;
   determining, by the controller, tooth surface pressures of gears in the powertrain between the motor and the driving wheels based on the obtained powertrain state information;
   generating, by the controller, a virtual effect signal for generating a virtual effect that simulates powertrain characteristics of the internal combustion engine vehicle based on the determined tooth surface pressures of the gears in the powertrain; and
   generating, by the controller, the virtual effect that simulates the powertrain characteristics of the internal combustion engine vehicle by controlling operation of a virtual effect generation device that generates the virtual effect according to the generated virtual effect signal.

2. The method according to claim 1, wherein the powertrain state information includes information on backlash in the powertrain, information on shaft torsion in the powertrain, and information on input torque applied from the motor to the powertrain.

3. The method according to claim 2, wherein the input torque is one of a motor torque command for controlling an operation of the motor, a motor torque estimate estimated by the controller, a motor torque detection value detected by a sensor, a filter applied value to the motor torque command, a filter applied value to the motor torque estimate, and a filter applied value to the motor torque detection value.

4. The method according to claim 2, wherein the information on shaft torsion includes a shaft torsional speed determined from the input torque applied to the powertrain from the motor and a powertrain spring stiffness.

5. The method according to claim 4, wherein the powertrain spring stiffness is determined from a powertrain rotational speed difference value generated between the motor and the driving wheels, and the input torque,
wherein the powertrain rotational speed difference value is determined by a difference value between a motor speed detected by a motor speed detection resolver and an equivalent wheel speed,
wherein the equivalent wheel speed is an equivalent wheel speed in the motor determined by using a gear ratio between the motor and the driving wheels from wheel speed detected by a wheel speed detection sensor.

6. The method according to claim 2, wherein the information on backlash includes a backlash speed caused by a powertrain rotational speed difference between the motor and the driving wheels,
wherein the backlash speed is determined as a value obtained by filtering a difference value between a powertrain rotational speed difference value and a shaft torsional speed which is the information on shaft torsion,
wherein the powertrain rotational speed difference value is obtained from a motor speed detected by a motor speed detection resolver and driving wheel speed detected by a wheel speed detection sensor.

7. The method according to claim 6, wherein the powertrain rotational speed difference value is determined from a difference value between the motor speed and an equivalent wheel speed,
wherein the equivalent wheel speed is an equivalent wheel speed in the motor determined by using a gear ratio between the motor and the driving wheels from the detected driving wheel speed.

8. The method according to claim 2, wherein the tooth surface pressures of the gears in the powertrain is determined by following equation (Equation 1') from a shaft torsional speed which is the information on shaft torsion, a backlash speed which is the information on backlash, and a motor torque command which is the information on input torque, gear tooth surface pressure= Saturation$_{minimum\ value}^{maximum\ value}$($A \times T_{cmd} + B \times$ shaft torsional speed−$C \times$backlash speed)  Equation 1':

wherein A, B, and C are preset values set in the controller, $T_{cmd}$ is the motor torque command, maximum and minimum values are preset values, and Saturation( ) indicates that values in ( ) are limited to the maximum and minimum values.

9. The method according to claim 2, wherein the tooth surface pressures of the gears in the powertrain is determined by following equation (Equation 2') from a shaft torsional speed which is the information on shaft torsion, a backlash speed which is the information on backlash, and a motor torque command which is the information on input torque, $$\text{gear tooth surface pressure} = \begin{cases} D \times T_{cmd} + E \times \text{shaft torsional speed}, & |\text{backlash speed}| \leq F \\ \text{minimum value or } 0, & |\text{backlash speed}| > F \end{cases} \quad \text{Equation 2}$$

wherein D and E are preset values set in the controller, minimum value is a preset value, F is a preset backlash determination threshold, and $T_{cmd}$ is the motor torque command.

10. The method according to claim 1, wherein the virtual effect includes one or both of virtual vibration simulating vibrations generated by the powertrain in the internal combustion engine vehicle, and virtual sound simulating sounds generated by the powertrain in the internal combustion engine vehicle.

11. The method according to claim 1, wherein in the generating the virtual effect signal, the controller determines magnitude of the virtual effect linked to the tooth surface pressures of the gears in the powertrain, and generates the virtual effect signal of a waveform having the magnitude of the virtual effect as an amplitude.

12. The method according to claim 11, wherein the controller is set to determine the magnitude of the virtual effect as a larger value as a size of the tooth surface pressures of the gears in the powertrain increases.

13. The method according to claim 11, wherein the controller determines the magnitude of the virtual effect as a preset minimum value when the tooth surface pressures of the gears in the powertrain correspond to pressures in a preset backlash section.

14. The method according to claim 11, wherein the controller scales a size of the tooth surface pressures of the gears in the powertrain to obtain a value proportional to the size of the tooth surface pressures, and determines the magnitude of the virtual effect as a value obtained by adding a set minimum value to the obtained value.

15. The according to claim 11, wherein a waveform profile of the virtual effect signal is set differently according to a direction of a torque transmitted by the gears in the powertrain.

16. The method according to claim 15, wherein when the torque transmitted by the gears in the powertrain is a forward torque that accelerates a vehicle, a peak shape of the waveform is set to a relatively sharper shape compared to a case of a reverse torque decelerating a vehicle.

17. The method according to claim 16, wherein the controller generates the virtual effect signal as a waveform of a profile obtained by synthesizing a first profile in a forward direction and a second profile in a reverse direction in the direction of the torque when the tooth surface pressures of the gears in the powertrain correspond to pressures in a preset backlash section.

18. The method according to claim 1, further comprising:
obtaining, by the controller, real-time vehicle driving information; and
generating a basic torque command from the obtained real-time vehicle driving information, wherein the controller generates a virtual effect command for generating a virtual effect in the generating a virtual effect signal, generates a final torque command from the generated virtual effect command and the generated basic torque command in the generating a virtual effect, and controls operation of the motor as the virtual effect generation device according to the final torque command.

19. The method according to claim 1, wherein the virtual effect generation device is a vibration device that generates a vibration of an amplitude according to a waveform of the virtual effect signal in the electric vehicle.

20. The method according to claim 1, wherein the virtual effect generation device is a sound device that generates and outputs a sound of a volume according to a waveform of the virtual effect signal in the electric vehicle.

* * * * *